US007233964B2

United States Patent
Bakalash et al.

(10) Patent No.: US 7,233,964 B2
(45) Date of Patent: Jun. 19, 2007

(54) METHOD AND SYSTEM FOR COMPOSITING THREE-DIMENSIONAL GRAPHICS IMAGES USING ASSOCIATIVE DECISION MECHANISM

(75) Inventors: Reuven Bakalash, Shdema (IL); Ofir Remez, Hod HaSharon (IL)

(73) Assignee: Lucid Information Technology Ltd., Ramat Gan (IL)

( * ) Notice: Subject to any disclaimer, the term of this patent is extended or adjusted under 35 U.S.C. 154(b) by 0 days.

(21) Appl. No.: 10/542,554

(22) PCT Filed: Jan. 28, 2004

(86) PCT No.: PCT/IL2004/000079

§ 371 (c)(1),
(2), (4) Date: Dec. 14, 2005

(87) PCT Pub. No.: WO2004/070652

PCT Pub. Date: Aug. 19, 2004

(65) Prior Publication Data

US 2006/0146072 A1    Jul. 6, 2006

Related U.S. Application Data

(60) Provisional application No. 60/442,750, filed on Jan. 28, 2003.

(51) Int. Cl.
*G06T 15/00*    (2006.01)

(52) U.S. Cl. ............... 708/207; 708/671; 340/146.2; 345/422

(58) Field of Classification Search .......... 708/160, 708/207, 671, 700; 706/4; 340/146.2; 345/422
See application file for complete search history.

(56) References Cited

U.S. PATENT DOCUMENTS

| 4,998,219 A | | 3/1991 | Frauenglass ............... 708/207 |
|---|---|---|---|
| 5,515,306 A | * | 5/1996 | Blaner et al. ............... 708/207 |
| 5,721,809 A | | 2/1998 | Park ............................ 706/4 |
| 6,748,405 B2 | | 6/2004 | de Tremiolles et al. ..... 708/207 |

(Continued)

OTHER PUBLICATIONS

Eyles et al., "PixelFlow: The Realization," ACM Siggraph, 1997, pp. 1.13.

(Continued)

*Primary Examiner*—Phu K. Nguyen
(74) *Attorney, Agent, or Firm*—Banner & Witcoff, Ltd.

(57) ABSTRACT

A method and system for compositing a plurality of three-dimensional Sub-Images by examining the Depth values of the Pixels corresponding to same spatial location in each Sub-Image and compositing the content of the Pixel having the greatest Depth value. The Depth values are divided into two or more binary Segments, where the bit length of the Segments is determined according to their level of significance. In a first step, the numerical values of the Segments having the same level of Significance are simultaneously compared, and accordingly a group designating the Depth values which the numerical value of their Most Significant Segment is the greatest is determined, and a Grade is evaluated for the Least Significant Segments indicating their numerical size in comparison with the numerical value of the other Segments of the same level of significance. In a second step, the Grades of the Segments of the Depth values which corresponds to the group are compared, and Depth value indications are removed from the group if their Grade is less than the highest Grade which corresponds to another Depth values in the group. The second step is repeated until the last set of Segments is reached or until a single Depth values is designated by the group.

19 Claims, 9 Drawing Sheets

Compositing System

U.S. PATENT DOCUMENTS

| | | |
|---|---|---|
| 6,769,005 B1 * | 7/2004 | Ott .............................. 708/207 |
| 6,772,187 B1 | 8/2004 | Ott et al. ..................... 708/700 |
| 7,072,922 B2 * | 7/2006 | Andreev et al. ............ 708/207 |
| 2001/0013048 A1 | 8/2001 | Imbert de Tremiolles et al. |

OTHER PUBLICATIONS

Froumentin & Willis, An Efficient 2-1/2 Rendering and Compositing System, *Eurographics* 18, 1999, pp. 1-11.

Gribble et al., "Interactive Volume Rendering of Large Datasets Using the Silicon Graphics Onyx4 Visualization system," Techn. Report, School of Com., University of Utah, Salt Lake City, UT 84112, Jan. 27, 2004, pp. 1-6.

Molnar, "Combining Z-buffer Engines for Higher-Speed Rendering," *Advances in Computer Graphics Hardware III* (Proceedings of the 1988 Eurographics Workshop on Graphics Hardware), Eurographics Seminars, 1988, pp. 171-82.

Reinhard & Hansen, "A Comparison of Parallel Compositing Techniques on Shared Memory Architectures," *Eurographics Workshop on Parallel Graphics and Visualization*, Girona, 2000, pp. 1-9.

Molnar, Steven; COX, Michael; Ellsworth, David; FUCHS, Henry. "A Sorting Classification of Parallel Rendering", 8222 IEEE Computer Graphics and Applications, No. 4, Jul. 14, 1994, Los Alamitos, CA.

* cited by examiner

*Fig. 2B*
*(Prior Art)*
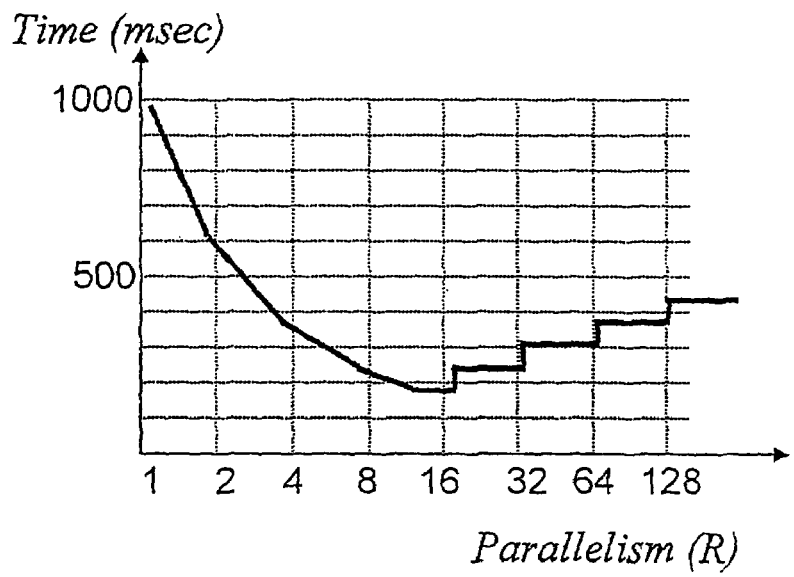
*Fig. 3A*
*(Prior Art)*
Stage 1
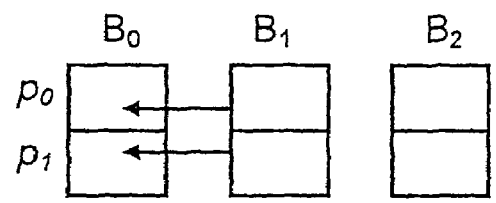
Stage 2
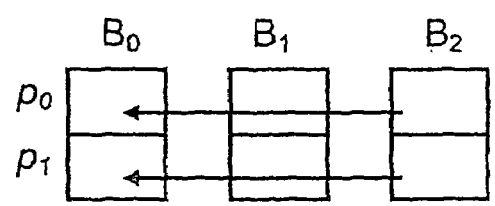
*Fig. 3B*
*(Prior Art)*
Do in parallel
let $B$ = sub-image $i$ for processor $p_i$
for $n = 1, 2, 3, ..., P$
composite sub-images $B_0$ and $B_n$ Compositing time for 1024 images.

Compositing System

| | Primary segment (8 bits) Carry-out(→) or stop | 2nd segment (8 bits) Carry-in, stop-mark, carry-out | 3d segment (8 bits) Carry-in, stop-mark, carry-out | 4th segment (8 bits) Carry-in, stop-mark, carry-out | Win |
|---|---|---|---|---|---|
| a | stop | 7 | | | |
| b | → | →9→ | →9→ | →8→ | →5→ |
| c | → | →8 | 9 | 7 | |
| d | stop | 9 | 9 | 7 | |
| e | → | →9→ | →2 | 1 | |

$Z_1$:  10001001   10101000   01000011   11111111

$Z_2$:  10101010   10101011   01000011   11111110

$Z_3$:  10101010   10101010   01000011   11111101

$Z_4$:  10101000   10101011   01000011   11111100

$Z_5$:  10101010   10101011   00111111   00000000

$\quad\quad\; Z_j^{(3)}\quad\quad\; Z_j^{(2)}\quad\quad\; Z_j^{(1)}\quad\quad\; Z_j^{(0)}$

*Fig. 12*

METHOD AND SYSTEM FOR COMPOSITING THREE-DIMENSIONAL GRAPHICS IMAGES USING ASSOCIATIVE DECISION MECHANISM

CROSS-REFERENCE TO RELATED APPLICATIONS

This application claims the benefit of U.S. Provisional Patent Application No. 60/442,750 filed on Jan. 28, 2003, the entire disclosure of which is incorporated herein reference.

This application is a National Stage application of co-pending PCT application PCT/IL2004/000079 filed Jan. 28, 2004. which was published in English under PCT Article 21(2) on Aug. 19, 2004 and which claims the benefit of U.S. provisional application Ser. No. 60/442,750 filed Jan. 28, 2003. These applications are incorporated herein by reference in their entireties.

FIELD OF THE INVENTION

The present invention relates to the field of computer graphics rendering. More particularly, the invention relates to a method and apparatus for the re-composition of multiple three-dimensional/depth raster images into a two dimensional image.

BACKGROUND OF THE INVENTION

As with many types of information processing implementations, there is a ongoing effort to improve performance of computer graphics rendering. One of the attractive attempts to improve rendering performance is based on using multiple graphic processing units (GPUs) harnessed together to render in parallel a single scene.

There are three predominant methods for rendering graphic data with multiple GPUs. These include Time Domain Composition, in which each GPU renders the next successive frame, Screen Space Composition, in which each GPU renders a subset of the pixels of each frame, and Scene based Composition, in which each GPU renders a subset of the database.

In Time Domain Composition each GPU renders the next successive frame. A major disadvantage of this method is in having each GPU rendering an entire frame. Thus, the speed at which each frame is rendered is limited to the rendering rate of a single GPU. While multiple GPUs enable a higher frame rate, a delay can be imparted (i.e., impairing latency) in Time Domain Composition applications in the response time of the system to user's input. These delays typically occurs since at any given time only one GPU is engaged in displaying a rendered frame, while all the other GPUs are in the process of rendering one of a series of frames in a sequence. In order to maintain a steady frame rate, the system delays acting on the user's input until the specific GPU that first received the user's input cycles through the sequence and is again engaged in displaying its rendered frame. In practical applications, this condition serves to limit the number of GPUs that are used in a system.

Another difficulty associated with Time Domain Composition applications is related to the large data sets that each GPU should be able to access, since in these applications each GPU should be able to gain access to the entire data used for the image rendering. This is typically achieved by maintaining multiple copies of large data sets in order to prevent possible conflicts due to multiple attempts to access a single copy.

Screen Space Composition applications have a similar problem in the processing of large data sets, since each GPU must examine the entire data base to determine which graphic elements falls within its part of the screen. The system latency in this case is equivalent to the time required for rendering a single frame by a single GPU.

The Scene Compsition methods, to which the present invention relates, excludes the aforementioned latency problems, the requirement of maintaining multiple copies of data sets, and of the problems involved in handling the entire database by each GPU.

The Scene Composition methods well suits applications requiring the rendering of a huge amount of geometrical data. Typically these are CAD applications, and comparable visual simulation applications, considered as "viewers," meaning that the data have been pre-designed such that their three-dimensional positions in space are not under the interactive control of the user. However, the user does have interactive control over the viewer's position, the direction of view, and the scale of the graphic data. The user also may have control over the selection of a subset of the data and the method by which it is rendered. This includes manipulating the effects of image lighting, coloration, transparency and other visual characteristics of the underlying data.

In CAD applications, the data tends to be very complex, as it usually consists of massive amount of geometry entities at the display list or vertex array. Therefore the construction time of a single frame tends to be very long (e.g., typically 0.5 sec for 20 million polygons), which in result slows down the overall system response.

Scene Composition (e.g. object based decomposition) methods are based on the distribution of data subsets among multiple GPUs. The data subsets are rendered in the GPU pipeline, and converted to Frame Buffer (FB) of fragments (sub-image pixels). The multiple FB's sub-images have to be merged to generate the final image to be displayed. As shown in FIG. 1, for each pixel in the X/Y plane of the final image there are various possible values corresponding to different image depths presented by the FBs' sub-images.

Each GPU produces at most one pixel 12 at each screen's (X/Y) coordinate. This composed pixel 12 is a result of the removal of hidden surfaces and the shading and color blending needed for effectuating transparency. Each of the pixels 12 generated by the GPUs holds a different depth measure (Z-value), which have to be resolved for the highest Z (the closest to the viewer). Only one pixel is finally allowed through. The merging of the sub-image of each FB is the result of determining which value (10) from the various possible pixels values 12 provided by the FBs represents the closest point that is visible in viewer's perspective. However, the merging of the partial scene data to one single raster, still poses a performance bottleneck in the prior art.

The level of parallelism in the prior art is limited, due to the inadequacies in the composition performance of multiple rasters. The composition of two rasters is usually performed by Z-buffering, which is a hardware technique for performing hidden surface elimination. In the conventional methods of the prior art Z-buffering allows merging of only two rasters at a time.

Conventional hardware compositing techniques, as examplified in FIG. 2A, are typically based on an iterative collating process of pairs of rasters (S. Molner "*Combining Z-buffer Engines for Higher-Speed Rendering*," Eurographics, 1988), or on pipelined techniques (J. Eyes at al. "*PixelFlow: The Realization*," ACM Siggraph, 1997). The merging of these techniques is carried out within $\log_2 R$ steps, of S stages, wherein R is the number of rendering GPUs. In the collating case, the time needed to accomplish comparison between two depth measures at each such comparator (MX) is $\log_2 Z$, where Z is the depth domain of the scene. E.g. for typical depth buffers with 24 bits per pixel, the comparison between two Z-buffers is typically performed in 24 time clocks.

Since in the prior art techniques the merging of only two Z-buffers is allowed at a time, composition of multiple rasters is made in a hierarchical fashion. The complexity of these composition structures is $O(\log_2 R)$, making the performance highly effected by R, the number of graphic pipelines. For growing values of R the compositing time exceeds the allocated time slot for real time animation. In practical applications, this condition serves to limit the number of GPUs that are used in a system. FIG. 2B shows the theoretical improvement of performance by increasing parallelism. The composition time grows by the factor of the complexity, $O(\log_2 R)$. The aggregated time starts increasing at (e.g.) 16 pipelines. Obviously, In this case there is no advantage in increasing the level of parallelism beyond 16.

Software techniques are usually based on compositing the output of R GPUs by utilizing P general purpose processors (E. Reinhard and C. Hansen "*A Comparison of Parallel Compositing Techniques on Shared Memory Architectures,*" *Eurographics Workshop on Parallel Graphics and Visualisation*, Girona, 2000). However, these solutions typically requires utilizing (i) binary swap, (ii) parallel pipeline, and (iii) shared memory compositor, which significantly increase the complexity and cost of such implemetations.

The most efficient implementation among the software techniques is the Shared Memory Compositor method (known also as "Direct Send" on distributed memory architectures). In this method the computation effort for rendering the sub-images is increased by utilizing additional GPUs (renderers), as shown in the block diagram of FIG. 3A and the pseudo code shown in FIG. 3B. In the system illustrated in FIG. 3A, 2 compositors (CPUs, $p_0$ and $p_1$) are operating concurrently on the same sub-images, which are generated by 3 renderers (GPUs, $B_0$, $B_1$, and $B_2$). The computation task distributed between the CPUs, each performing composition of one half of the same image. It is well-known that for any given number of GPUs one can speed up the compositing by increasing the number of parallel compositors.

However, increased number of renderers slows down the performance severely. The complexity of this method is $O(N*R/P)$ where N is the number of pixels in a raster (image), R is the number of GPUs, and P is the number of compositing units (CPUs, $P_i$). The compositing process in this technique is completed within R−1 iterations. In the implementation of this technique on SGI's Origin 2000 Supercomputer the compositing was carried out utilizing CPUs. The results of the compositing performed by this system are shown in FIG. 4. FIG. 4 demonstrates the overhead of this method, the compositing time required for this system is over 6 times the time required for the rendering.

All the methods described above have not yet provided satisfactory solutions to the problems of the prior art methods for compositing large quantities of sub-images data into one image.

It is an object of the present invention to provide a method and system for rendering in parallel a plurality of sub-image frames within a close to real time viewing.

It is another object of the present invention to provide a method and system for concurrently composing large amounts of sub-image data into a single image.

It is a further object of the present invention to provide a method and system which substantially reduce the amount of time requires for composing sub-image data into a single image.

It is a still another object of the present invention to provide a method and apparatus for concurrently composing large amounts of sub-image data into a single image that can be implemented efficiently as a semiconductor based device.

It is a still further object of the present invention to provide a method and apparatus for composing sub-image data based on presenting a competition between the multiple sources of the sub-image data.

Other objects and advantages of the invention will become apparent as the description proceeds.

SUMMARY OF THE INVENTION

In one aspect the present invention is directed to a method and system for detecting the greatest number from a plurality of Numbers $Z_1, Z_2, \ldots, Z_R$. Each of the Numbers is divided into two or more binary Segments $Z_j^{(N-1)}$, $Z_j^{(N-2)}, \ldots, Z_j^{(0)}$, where the bit length of the Segments is determined according to their level of significance and where sets of the Segments are arranged according to their level of significance wherein the first set of Segments $Z_j^{(N-1)}, Z_j^{(N-1)}, \ldots, Z_j^{(N-1)}$ includes the Most Significant Segments of the Numbers and the last set of Segments $Z_j^{(0)}$, $Z_j^{(0)}, \ldots, Z_j^{(0)}$ includes the Least Significant Segments of the Numbers. In the first step, the numerical values of the Segments $Z_1^{(K)}, Z_2^{(K)}, \ldots, Z_R^{(K)}$ having the same level of Significance are simultaneously compared, for determining a group designating the Numbers which the numerical value of their Most Significant Segment is the greatest, and evaluating for the Least Significant Segments a Grade indicating their numerical size in comparison with the numerical value of the other Segments of the same level of significance. In a second step, starting from the second set of Segments $Z_1^{(N-2)}, Z_2^{(N-2)}, \ldots, Z_R^{(N-1)}$, the Grades of the Segments of the Numbers which corresponds to the group are compared, and Number indications are removed from the group if their Grade is less than the highest Grade which corresponds to another Number indication in the group. The second step is repeated until the last set of Segments $Z_1^{(0)}$, $Z_2^{(0)}, \ldots, Z_R^{(0)}$ is reached or until a single Number is designated by the group.

Optionally, the Numbers are the depth values of pixels of multiple three-dimensional raster images.

The detection of the greatest number may further comprise comparing the Numbers with a threshold value and carrying but the detection of the greatest number only with the Numbers which their value is above or below the threshold value.

A similar detection may be carried out for determining the smallest number, by designating by the group the Numbers which the numerical value of their Most Significant Segment is the smallest and by removing from the group Numbers designations whenever their Grade is greater than the smallest Grade which corresponds to another Number indication in said group.

In one preferred embodiment of the invention, all the segments are of the same bit length. Alternatively, the bit length of one or more of the Least Significant Segments is greater than the bit length of the Most Significant Segment.

In another aspect, the present invention is directed to a method and system for compositing a plurality of three-dimensional Sub-Images by examining the Depth values $Z_1$, $Z_2, \ldots, Z_R$, of the Pixels corresponding to same spatial location in each Sub-Image and compositing the content of the Pixel having the greatest Depth value. The Depth values are divided into two or more binary Segments $Z_j^{(N-1)}$, $Z_j^{(N-2)}, \ldots, Z_j^{(0)}$, where the bit length of the Segments is determined according to their level of significance and where sets of the Segments are arranged according to their level of significance wherein the first set of Segments $Z_1^{(N-1)}, Z_j^{(N-1)}, \ldots, Z_j^{(N-1)}$ includes the Most Significant Segments of the Depth values and the last set of Segments $Z_j^{(0)}, Z_j^{(0)}, \ldots, Z_j^{(0)}$ includes the Least Significant Segments of the Depth values. In a first step, the numerical values of the Segments $Z_1^{(K)}, Z_2^{(K)}, \ldots, Z_R^{(K)}$ having the same level of Significance are simultaneously compared, and accordingly a group designating the Depth values which the numerical value of their Most Significant Segment is the greatest is determined, and a Grade is evaluated for the Least Significant Segments indicating their numerical size in comparison with the numerical value of the other Segments of the same level of significance. In a second step, starting from the second set of Segments $Z_1^{(N-2)}, Z_2^{(N-2)}, \ldots, Z_R^{(N-1)}$, the Grades of the Segments of the Depth values which corresponds to the group are compared, and Depth value indications are removed from the group if their Grade is less than the highest Grade which corresponds to another Depth values in the group. The second step is repeated until the last set of Segments $Z_1^{(0)}, Z_2^{(0)}, \ldots, Z_R^{(0)}$ is reached or until a single Depth values is designated by the group.

The detection of the greatest number may further comprise comparing the Depth values with a threshold value and carrying out the detection of the greatest number only with the Depth values which their value is above or below the threshold value.

A similar detection may be carried out for determining the smallest number, by designating by the group the Depth values which the numerical value of their Most Significant Segment is the smallest and the Depth values designations are removed from the group whenever their Grade is greater than the smallest Grade which corresponds to another Number indication in said group.

In another preferred embodiment of the invention, all the segments are of the same bit length. Alternatively, the bit length of one or more of the Least Significant Segments is greater than the bit length of the Most Significant Segment.

The invention may be implemented on a single integrated circuit chip, for instance, it may be a VLSI implementation.

BRIEF DESCRIPTION OF THE DRAWINGS

In the drawings:

FIG. 2B graphically illustrates parallelism limitations of Hierarchical compositing performance;

FIGS. 3A and 3B include a block diagram and a pseudo-code showing the Shared Memory Compositing methods of the prior art;

FIG. 12 exemplifies a competition process of 5 depth values;

DETAILED DESCRIPTION OF PREFERRED EMBODIMENTS

The presented invention is directed to a method and system for re-composition of multiple three-dimensional/depth raster images into a two dimensional image in an associative fashion. According to a preferred embodiment of the invention the rendered graphics data (sub-images), provided via multiple graphic pipelines, is resolved at each raster coordinate for the closest pixel to the viewer. This task is accomplished by performing an autonomous associative decision process at each pixel, simultaneously for all pixels at a given raster coordinate by utilizing multiple Associative Units (AU). The final image obtained by the composition outcome is outputted for viewing. The present invention overcomes the inadequate overhead of the prior art methods, which are generally based on hierarchical combination of images for viewing.

In principle, the present invention presents a competition for the highest depth (Z) value among multiple sources. The highest depth value should be determined by utilizing multiple AUs. Each AU continuously examines the local depth value against the other values that are presented, and autonomously decides whether to quit the competition against other AUs or to further compete. In contrast to the conventional sorting methods, which are of sequential nature, according to the present invention a decentralized process can be performed in parallel, which substantially speeds up the composition performance. Additional advantages of the present invention are: (i) it can be performed on numbers of any length; and (ii) it suits any number of sources, without diminishing the performance.

Figure 1:
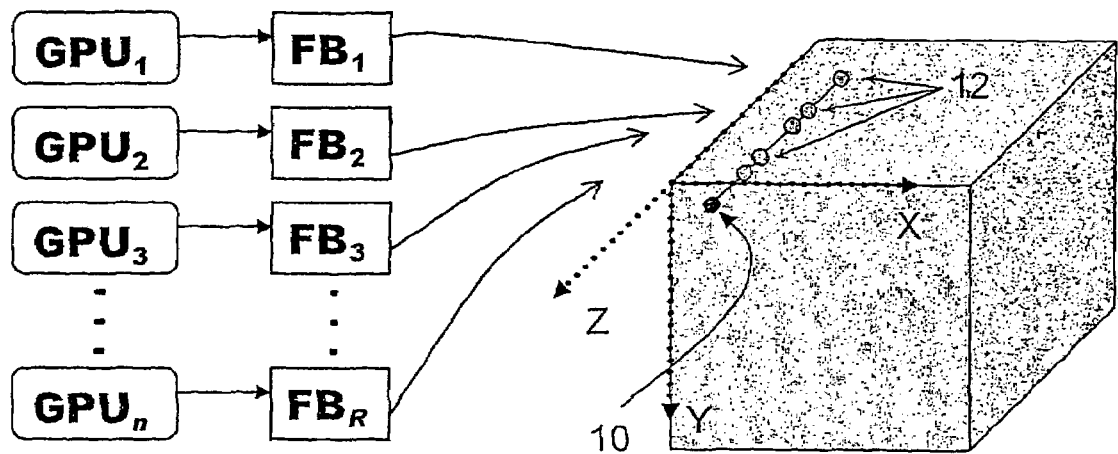
FIG. 1 is a block diagram illustrating the merging of a plurality of sub-images data into a single image.
Figure 2A:
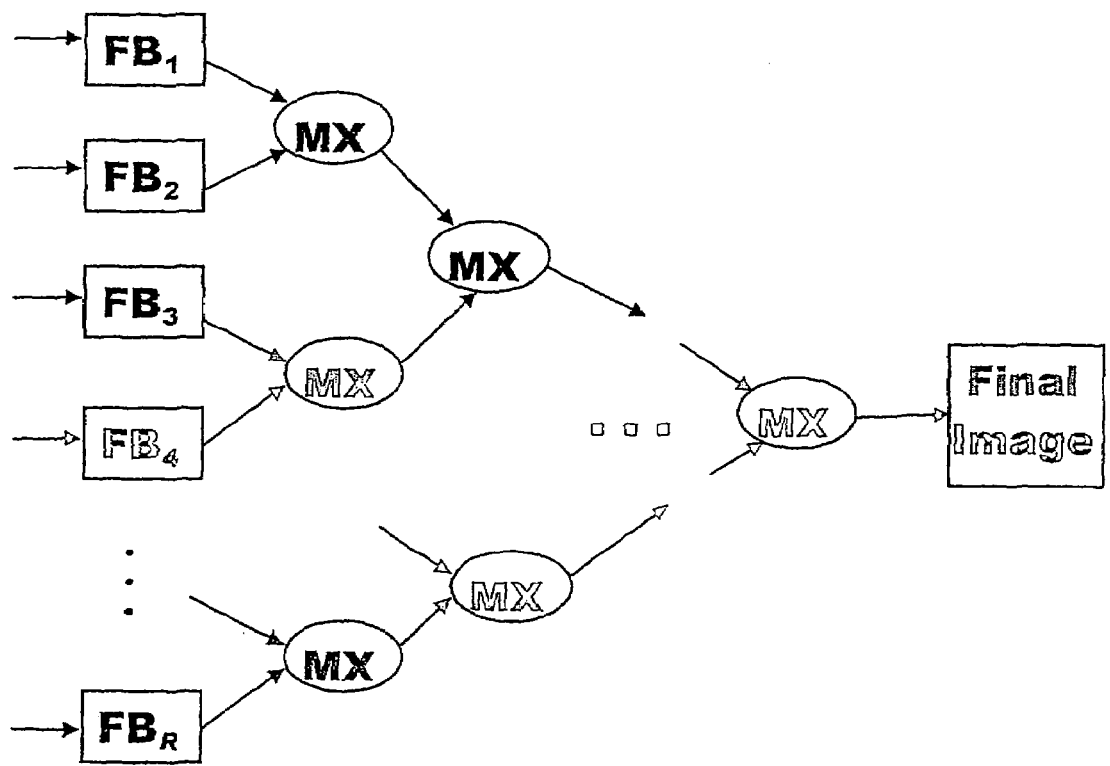
FIG. 2A is a block diagram illustrating the prior art Hierarchical compositing method.
Figure 4:
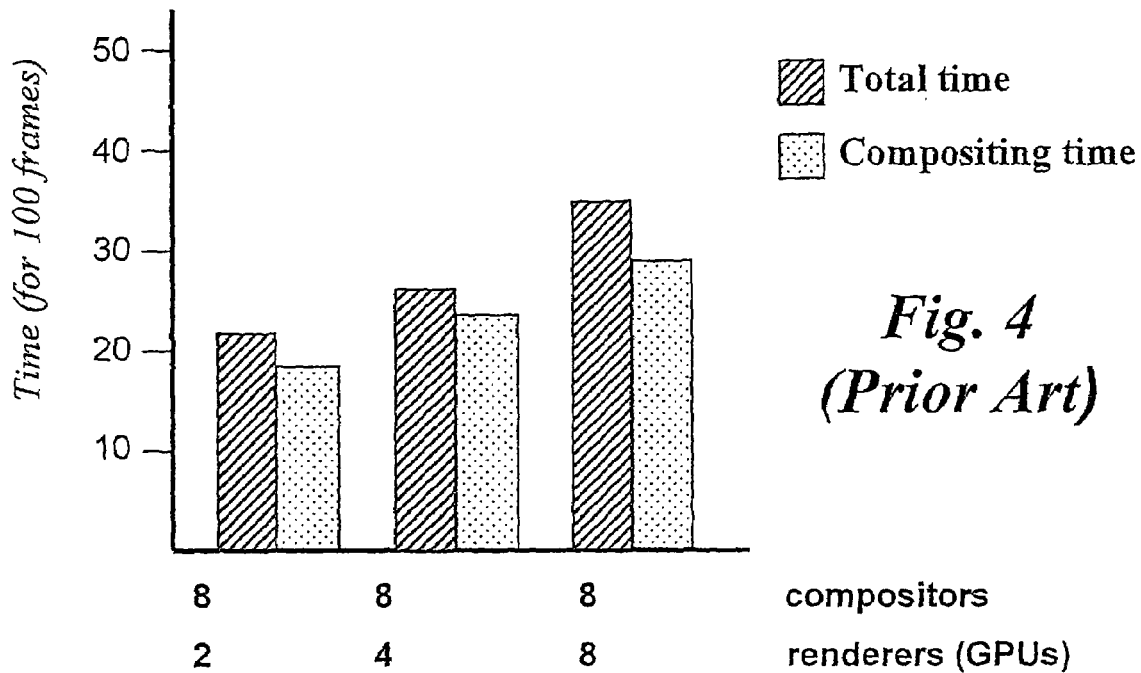
FIG. 4 graphically illustrates the performance of Shared Memory Composition methods of the prior art.
Figure 5:
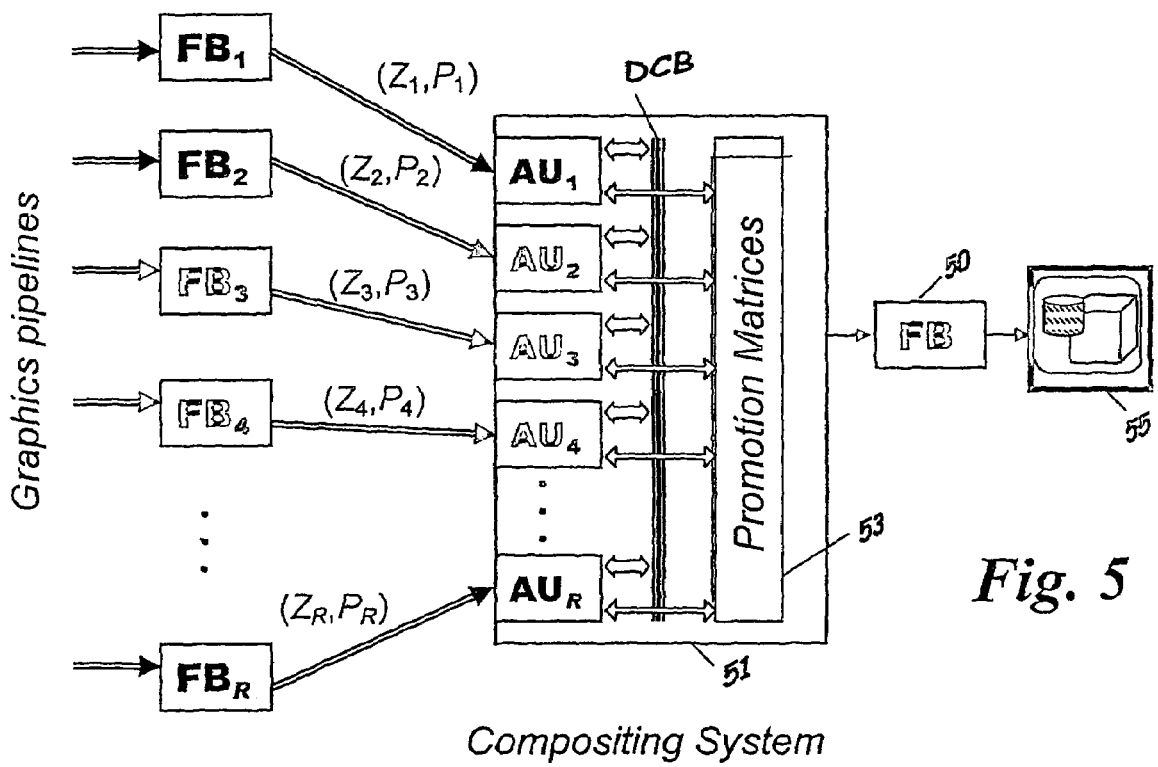
FIG. 5 is a block diagram exemplifying a preferred embodiment of the invention.

FIG. 5 provides a general illustration of the composing mechanism of the invention. The Composition System 51 of the invention is fed with the sub-image data provided by the graphics pipelines ($FB_j$, j=1, 2, 3, $\ldots$, R). At the Composition System 51 the sub-image's datum ($Z_j$, $P_j$) is provided to a set of R corresponding AUs ($AU_j$, j=1, 2, 3, $\ldots$, R), each of which is capable of handling image pixels at the same X/Y coordinate of the screen. Each competing datum is composed of contents $P_j$ (e.g. color, transparency, also referred to as RGB-value herein) and depth of a pixel $Z_j$.

The Z-values are received by the AUs and introduced on the Depth Competition Bus (DCB). The logical state of the DCB lines is sensed by the AUs which accordingly produces Carry-in and Stop-Mark vectors which are used together with the Promotion Matrices (PM) 53 to determine whether they hold the highest Z-value. The decision concerning a competing datum is carried out locally at each AU, based on an associative mechanism, and on comparison with other AUs on the DCB. Finally, the AU holding the closest pixel (i.e., highest Z-value) is allowed to pass the pixel's color $P_j$ (RGB-value) to the final raster 50, which constructs the final image 55.

Figure 7A:
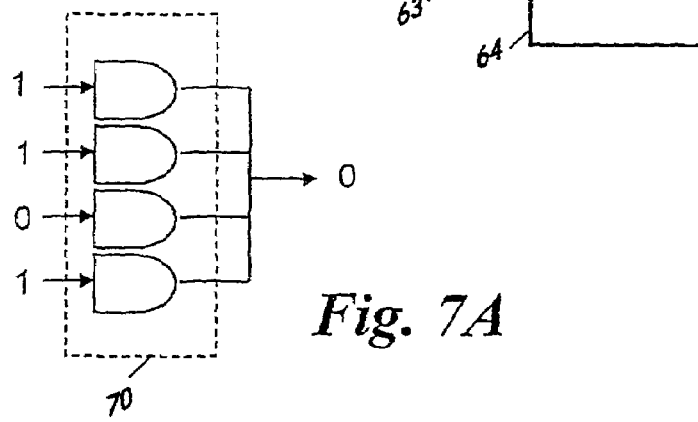
FIG. 7A is a block diagram demonstrating the principle of the Wired-AND function of the invention.
Figure 7B:
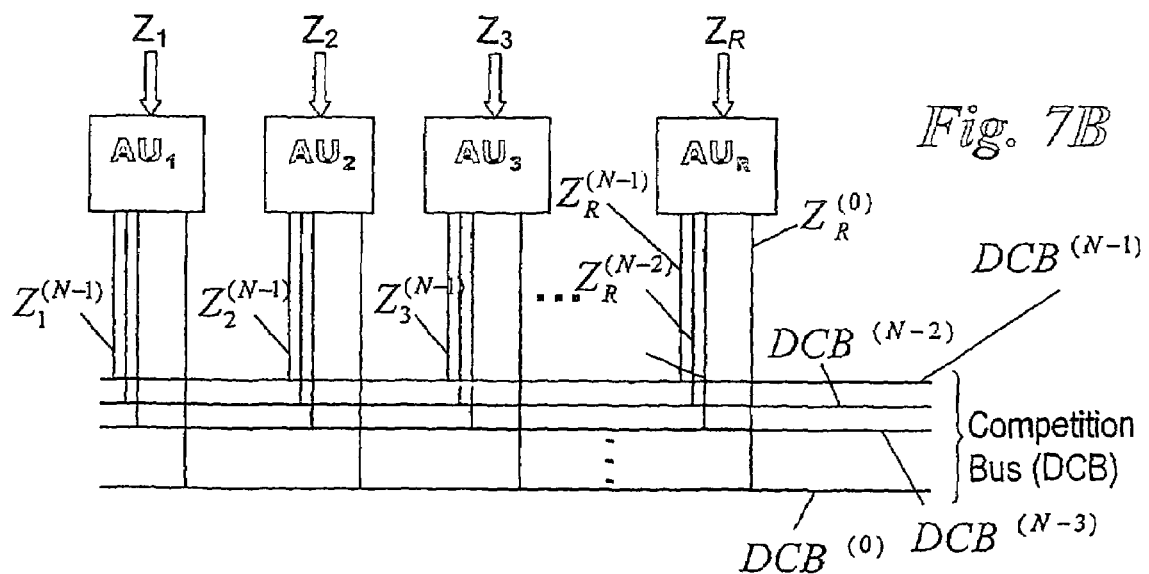
FIG. 7B is a block diagram illustrating the principle of wired-AND competition of N binary numbers.

The Depth Composition Bus (DCB) architecture intelligently deploys a wired-AND logic, as shown and demonstrated in FIGS. 7A and 7B. The functionality of the wired-AND logic 70 is similar to the functionality of the regular logical AND function. However, the Wired-AND function introduces numerous outputs on a single electric point, wherein the regular logical AND gate must output its signal to another gate, which is isolated from any other output. As demonstrated in FIG. 7A, a logical "0" state on any one of the inputs forces a logical "0" state on the output line.

The comparison process on the DCB is carried out in a bit-significance successive manner. As shown in FIG. 7B, each Z-value ($Z_1, Z_2, Z_3, \ldots, Z_R$) provided via the graphic pipeline ($FB_j$) is fed into the respective AU ($AU_j$). The lines of the DCB are used for outputting the wired-AND results of each segment of the N-binary Z-values ($Z_j^{(i)}$, i=0, 1, 2, ..., N), according to their level of significance. In this way the $DCB^{(0)}$ lines are used as outputs of the wired-AND logic carried out on the Least Significant Segment (LSS, also referred to as non-primary segment) of the Z-values ($Z_j^{(0)}$), and the $DCB^{(N-1)}$ lines are used for outputting the wired-AND carried out on the Most Significant Segment (MSS, also referred to as the primary segment) of the Z-values ($Z_j^{(N-1)}$).

The comparison process is carried out in an ordered fashion, starting from the most significant bits of the Z-values, and it is finalized at the least significant bits of the Z-values. The competition starts when the AUs output the Most Significant Bit (MSB) on the up most line of $DCB^{(N-1)}$. The duration of this process always takes a constant time of $\log_2 |Z|$, where $|Z|$ is the depth domain of the scene, i.e. the bit length of the Z-values. Consequently, the multiple-stage structure of the prior art methods, is replaced by a single stage according to the method of the present invention. The performance complexity of $O(\log_2 Z * \log_2 N)$ of the prior art methods is significantly reduced by the method of the present invention to $O(\log_2 Z)$.

In the comparison of the of the MSS bits $Z_j^{(N-1)}$, placing a single logical "0" state, or any number of them, on the DCB lines $DCB^{(N-1)}$, forces a "0" logical state on said lines. AUs which placed a "1" logical state on a DCB line, and sensed a resulting "0" logical state on said line, terminates their competition for their current Z-value, otherwise the AUs are permitted to continue their competition to the next successive bit (less in significance), as exemplified in Table 1.

TABLE 1 comparison of the MSS bits $Z_j^{(N-1)}$.

| Forced value | State of DCB line | Decision |
|---|---|---|
| "1" | "0" | "Stop" |
| "1" | "1" | "Continue" |
| "0" | "0" | "Continue" |
| "0" | "1" | "Continue" |

It should be noted that the last case shown in Table 1 above is actually not feasible, since the forcing of a logical "0" state on a DCB line must force this line to a logical "0" state.

The decision as to whether the Z-value ought to continue competing is established by each AU by sensing the logical state of the DCB lines. The last surviving AU "wins" the competition. When the comparison logic of the AUs identifies a higher Z-value on the bus, it detaches itself from the competition. Otherwise it keeps competing until the value remaining on the bus is the one with the highest Z-value.

Figure 8:
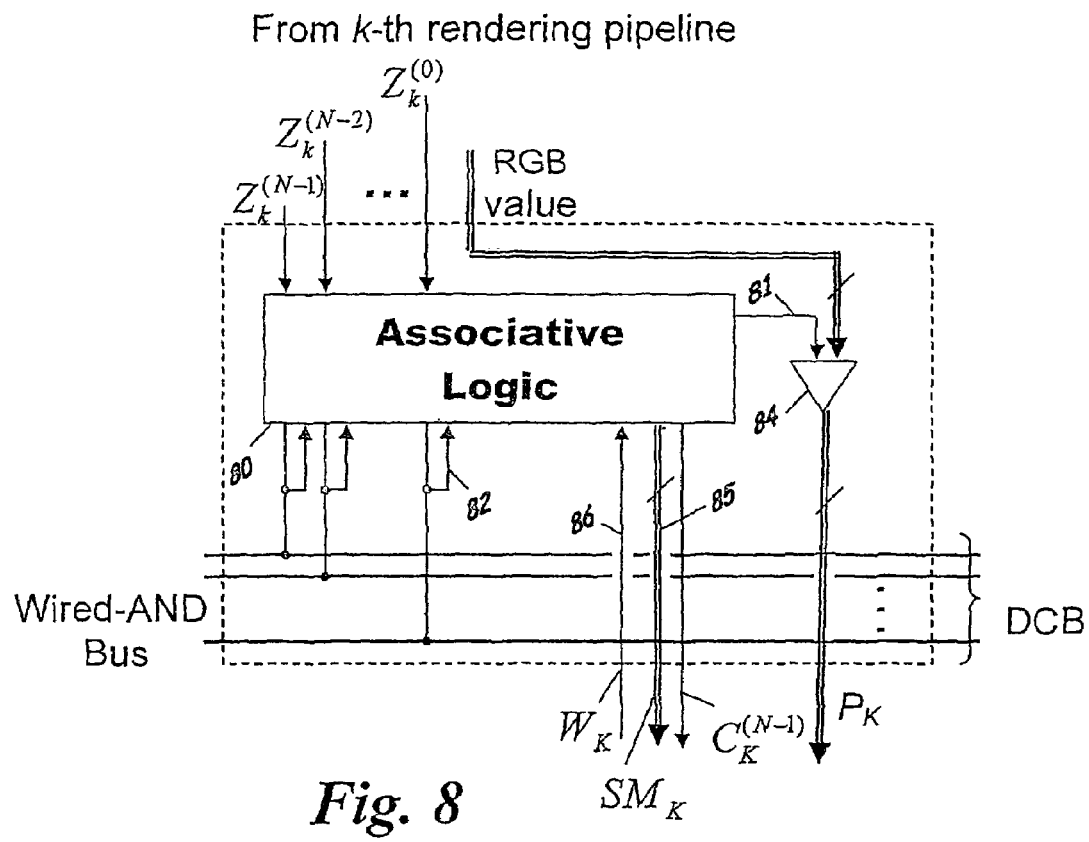
FIG. 8 is a block diagram illustrating a preferred embodiment of an Associative Unit.

FIG. 8 is a block diagram illustrating the AU operation. The $K^{th}$ Z-value ($Z_K^{(N-1)}, Z_K^{(N-2)}, \ldots, Z_K^{(0)}$) is wired to the DCB via a set of gates (90, shown in FIG. 9), and the pixel value $P_K$ is gated through to the merged FB 50 via gate 84. The Associative Logic 80 enables the Wired-AND functioning, controls the unit's competition, and allows the RGB-value $P_K$ to pass through to FB 50 utilizing an enabling indication 81, upon accepting winning acknowledge 86 ($W_K$) from one of the PM 53.

The AU generates a Stop Mark (SM) vector 85 $SM_K = (SM_K^{(0)}, SM_K^{(1)}, \ldots, SM_K^{(N-2)})$ which is generated by the Associative Logic 80 for the LSSs of the Z-value ($Z_K^{(i)}$, i=0, 1, 2, ..., N-2) and provided thereafter to the PM 53. A Carry-Out indication ($C_K^{(N-1)}$) is also produced by the $AU_k$ which indicates whether the MSS ($Z_K^{(N-1)}$) of the Z-value $Z_k$ won the first stage of the competition.

It should be noted that the associative logic 80 may be designed to extend the competition functionality of the AU in various ways. For instance, the inverse of the incoming Z-value may be used (in all AUs) for the competition, and in such case the competition between the AUs will be performed on the basis of determining the smallest depth value. Alternatively, one may prefer to place on Z-value inputs of the AUs a threshold value, and in this way to enable the competition of only those Z-values which are greater-than, or smaller-than, the threshold value.

At the local AU each Z-value $Z_j$ is segmented into N segments $Z_j^{(N-1)}, Z_j^{(N-2)}, \ldots, Z_j^{(0)}$, where the $(N-1)^{th}$ segment $Z_j^{(N-1)}$ holds the MSBs, and the (0) segment $Z_j^{(0)}$ holds the LSBs of $Z_j$. For example, let assume a 32 bits long Z-value number, processed in 3 segments (i.e., N=3, $Z_j^{(2)}$, $Z_j^{(1)}$, and $Z_j^{(0)}$), where the first and second segments ($Z_j^{(2)}$ and $Z_j^{(1)}$) are each 8 bits long and the third segment ($Z_j^{(0)}$) is 16 bits long. In the first stage of the competition one or more preliminary winners are determined according to the MSS (the first segment) of the Z-values ($Z_j^{(2)}$, j=1, 2, ..., R), and Stop-Marks grading ($SM_j^{(i)}$, i=0, 1, 2, ..., N-2, e.g., $SM_j^{(0)}$ and $SM_j^{(1)}$ for N=3) is established according to the competition between all the other segments (LSSs) of the Z-values ($Z_j^{(i)}$, i=0, 1, 2, ..., N-2, e.g., $Z_j^{(2)}$ and $Z_j^{(1)}$ for N=3). In the next step of the competition the Stop-Marks grading $SM_K^{(N-2)}$, (e.g., $SM_K^{(1)}$), which were established for the second segment ($Z_j^{(N-2)}$, e.g., $Z_j^{(1)}$), that corresponds to the Z-values which won the first stage, are examined to determine which of those Z-values continues to compete. The same process is carried out with the Stop-Marks grading established for the next segments ($SM_j^{(i)}$, i=0, 1, 2, ..., N-3, e.g., $SM_j^{(0)\ for\ N=}3$), until the highest Z-value is determined according to the results of the last segment (the LSS, $Z_j^{(0)}$).

Each AU processes all the segments ($Z_j^{(i)}$, i=0, 1, ..., N-1) in parallel. The AUs controls the entire Z-value numbers, according to the segmentation used from MSB to LSB. While the AU logic lets the first segment $Z_j^{(N-1)}$ to compete and submit its Carry-Out $C^{(N-1)}$ to $PM^{(N-1)}$ (FIG. 6), it lets the second segment $Z_j^{(N-2)}$ to compete and submit its Stop-Marks $SM^{(N-2)}$ to $PM^{(N-1)}$. Similarly, the third segment $Z_j^{(N-3)}$ of the Z-value competes and submit Stop-Marks grading $SM^{(N-3)}$ to $PM^{(N-2)}$, etc.

The segment length is chosen to optimize the competition performance. For example, for 32 bits long Z-values, processed in 3 segments, $Z_j^{(2)}$, $Z_j^{(1)}$ and $Z_j^{(0)}$, of 8, 8, and 16 bits respectively, the SM vectors for the second segments $SM^{(1)}$ can be prepared while the first segment $Z_j^{(2)}$ is processed, and the SM vectors for the third (the longest) segment $SM^{(0)}$ can be concurrently prepared taking the advantage of the time period required for the two previous segments, $Z_j^{(2)}$ and $Z_j^{(1)}$.

Figure 6:
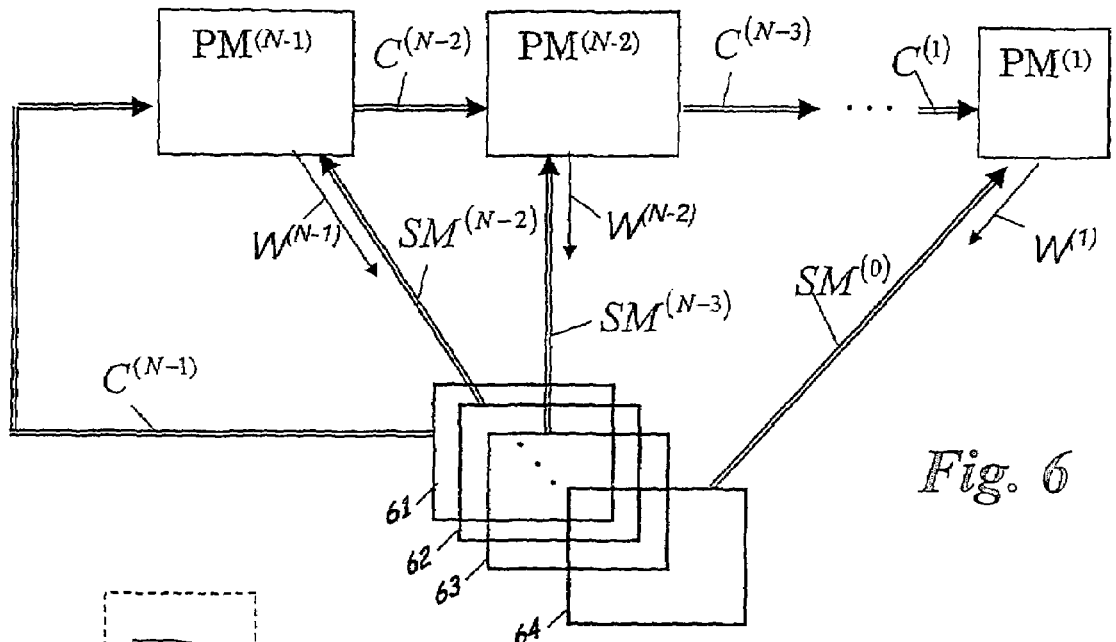
FIG. 6. is a block diagram illustrating a promotion system according to the invention.

This process is illustrated in FIG. 6. Numerals 61–64 schematically designates the indications generated by the AUs according to the segmentation of the Z-values. There are N−1 PMs 53 serving the LSSs of the Z-values ($Z_j^{(i)}$, i=0, 1, 2, . . . , N−2). The PMs 53 generates the Carry-Out vectors. $C^{(i)}$ ($C^{(N-2)}$, $C^{(N-3)}$, . . . , $C^{(1)}$) which are determined according to the respective Stop-Mark vectors $SM^{(i)} = SM_1^{(i)}$, $SM_2^{(i)}$, . . . , $SM_R^{(i)}$) generated by the AUs for the corresponding ($i^{th}$) segment, and the Carry-Out vectors $C^{(i-1)}$ which was produced by the $PM^{(i-1)}$ in the previous stage. Additional signals generated by the PMs is (a) the winning indication $W_j$, which designated the wining Z-values in each stage of the competition, and (b) and "stop competition" signal, that is generated once a single winner is determined which prevents subsequent matrices from carrying on their competition.

Figure 9:
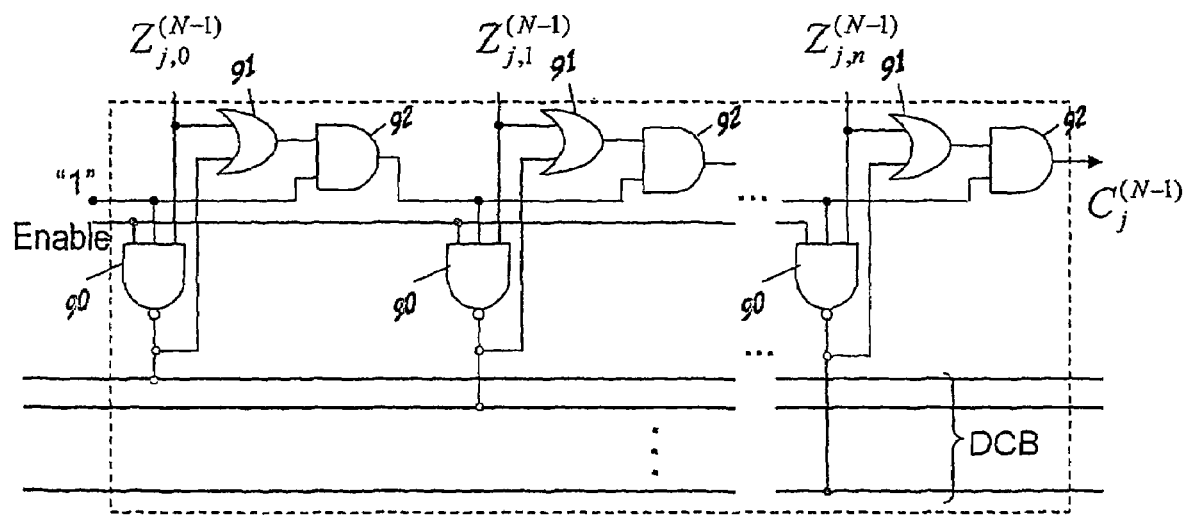
FIG. 9 is a block diagram schematically illustrating the logic of a Primary Segment.

The AUs logic for generating the Carry indications for the first segment $Z_j^{(N-1)} = (Z_{j,0}^{(N-1)}, Z_{j,1}^{(N-1)}, \ldots, Z_{j,n-1}^{(N-1)})$ of the Z-values is shown in FIG. 9. To exploit the Wired-AND functionality the inverse state of each bit is introduced to the DCB lines via the logical NAND gates 90. For each examined bit $Z_{j,k}^{(N-1)}$ a logical OR gate 92 is used for determining if the Z-value continues to compete in the next bit level $Z_{j,k+1}^{(N-1)}$ according to the logical state of the respective DCB line and the logical state of the examined bit $Z_{j,k}^{(N-1)}$. Each bit stage $Z_{j,k}^{(N-1)}$ controls the next bit stage $Z_{j,k}^{(N-1)}$ via the logical AND gates 92. The Carry-Out indication $C_j^{(N-1)}$ is generated only if all n bit stages survived the competition. The Carry-Out indication is provided to the $PM^{(N-1)}$ Promotion Matrix shown in FIG. 6, and in this way enables further competition of the Z-value $Z_j$ in the next segment.

Simultaneously, while the AUs examine the first segments of the Z-values, each of the LSSs ($Z_j^{(i)}$, i=0, 1, 2, . . . , N−2) is also examined by wired-AND logic. However, in the examination of the LSSs Stop-Mark $SM_j^{(i)}$ (i=0, 1, 2, . . . , N−2) signals are generated, instead of the Carry-Out $C_j^{(N-1)}$ indications which were generated for the first segment. Each Stop-Mark $SM_j^{(i)}$ signal is forwarded to the respective $PM^{(i)}$ Promotion Matrix as part of Stop-Mark vector $SM^{(i)}$.

Figure 10:
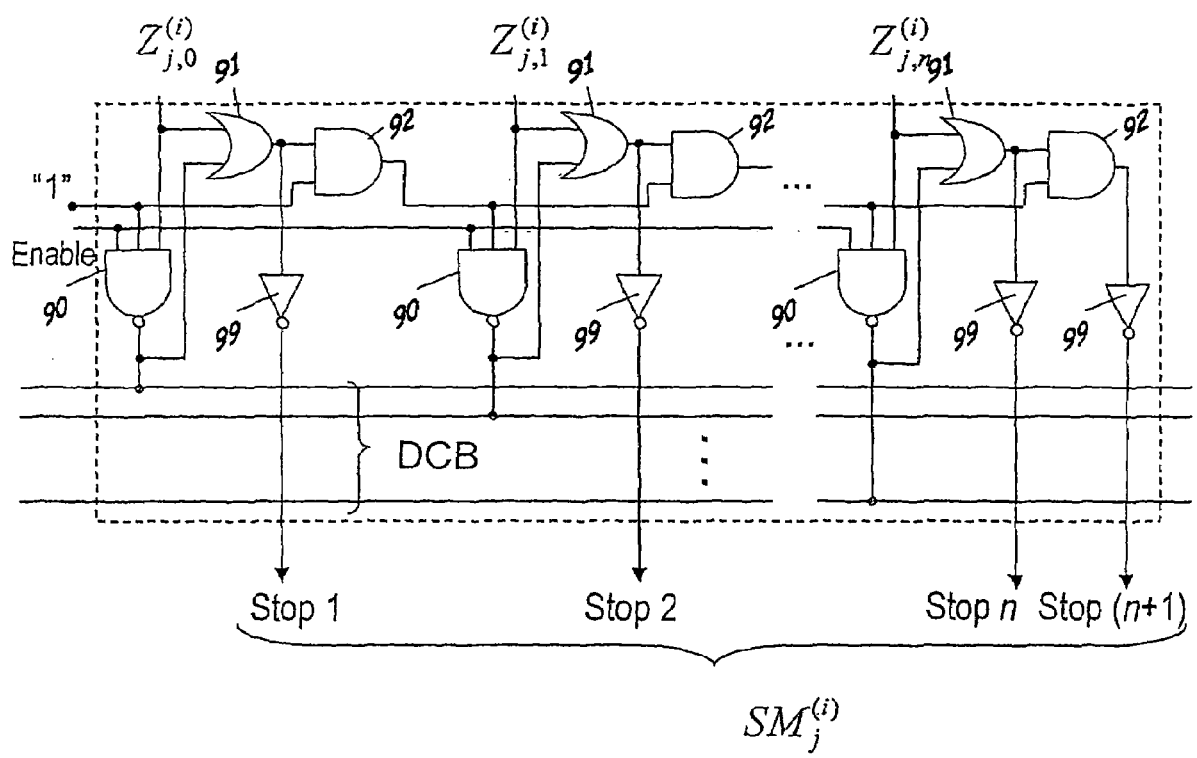
FIG. 10 is a block diagram schematically illustrating the logic of a Non-Primary Segment.

A Stop-Mark $SM_j^{(i)}$ indicates the "weak" bit of the respective segment $Z_j^{(i)}$ that potentially drops-out the entire Z-value $Z_j$ from the competition. The logic for generating the SM signals for the LSSs ($SM_j^{(i)}$, i=0, 1, 2, . . . , N−2) is shown in FIG. 10. In principal, this logic is similar to the logic used for the generation of the Carry-Out vector $C^{(N-1)}$. However, it differs in that each bit stage can generate a Stop-Mark signal, "stop 1"-"stop (n+1)", via inverters 99. For each LSSs segment ($Z_j^{(i)}$, i=0, 1, 2, . . . , N−2) only one Stop-Mark signal $SM_j^{(i)}$ is generated. The highest possible Stop-Mark signal "stop (n+1)" indicates that the examined segment did not fail in any of its wiring comparisons.

The logic of the Associative Matrices handles the Stop-Mark vector $SM_j^{(i)}$ and the previously generated Carry-Out vectors $C^{(i+1)}$, and generating a new Carry-Out vector $C^{(i)}$. In this new Carry-Out vector $C^{(i)}$ only those AUs which survived the competition so far are participating. If just a single AU survived, it becomes the final winner, discontinuing the competition process. Otherwise the next PM ($PM^{(i-1)}$) performs the same task, until a single winner is left.

Figure 11:
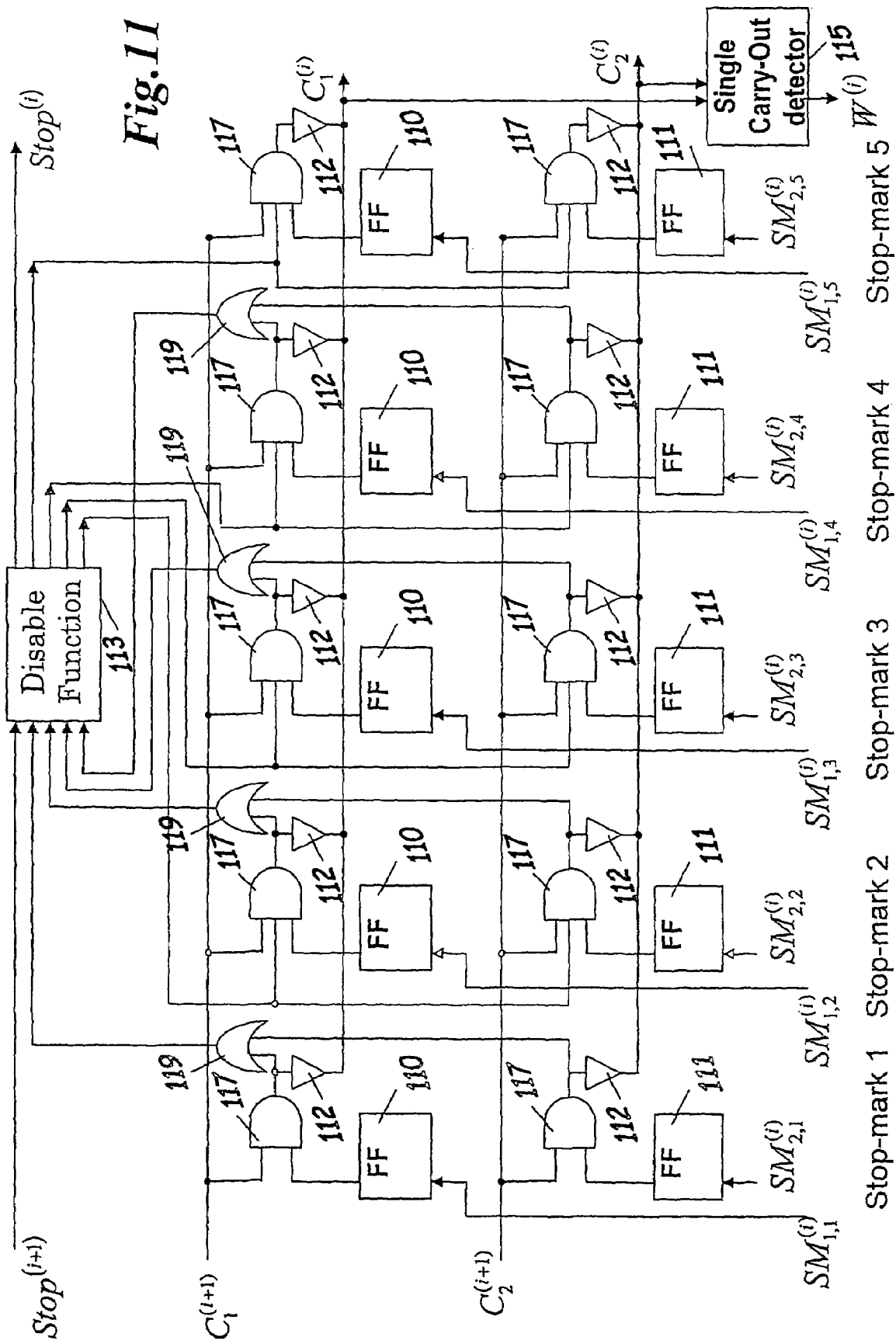
FIG. 11 is a block diagram schematically illustrating a reduced Promotion Matrix.

FIG. 11 is a block diagram illustrating the logic of a PM (reduced case). For the sake of simplicity FIG. 11 illustrates an $i^{th}$ PM (i.e., $PM^{(i)}$) serving two AUs (R=2), wherein the $i^{th}$ segment is 4 bits long (i.e., 5 Stop-Marks, $SM_j^{(i)} = (SM_{j,1}^{(i)}, SM_{j,2}^{(i)}, \ldots, SM_{j,5}^{(i)})$. Each of the Stop-Mark vectors $SM_1^{(i)}$ and $SM_2^{(i)}$ sets on one of the FFs 110 and 111. No more than one FF 110 and 111 can be in "ON" state in a row. The Stop-Mark vector for which a winning indication $C_j^{(i+1)}$ is received from the previous PM ($PM^{(i+1)}$) will generate a Carry-Out if, and only if there is no other Stop-Mark (in another row) with a higher number and having a Carry-Out indicating winning in the previous PM ($PM^{(i+1)}$).

The operation of previous columns in the PM is disabled via the Disable Function 113 upon receipt of a corresponding indication from the logical AND gates 117 gathered via the logical OR gate 119 of the column in which a Stop-Mark indication having the highest level is received, and for which a corresponding Carry-Out indication is received from the previous PM. If the Stop-Marks received by the PM are of the same significance (e.g., $SM_{1,4}^{(i)}$ and $SM_{2,4}^{(i)}$), Carry-Out indications $C_1^{(i)}$ and $C_2^{(i)}$ are provided to the next PM ($PM^{(i)}$) via buffers 112.

Only one winning $W^{(i)}$ signal can be produced by one of the PMs. Whenever Detector 115 indicates that a single winner was determined in the current stage, the Disable Function 113 produces a $Stop^{(i)}$ indication which will disable further processing by the PM of the next stage $PM^{(i-1)}$. Whenever a Stop signal is received by the Disable Function (e.g., $Stop^{(i+1)}$) it disables the functioning of the current and the following PMs by disabling the gates 117 and by issuing a Stop indication (e.g., $Stop^{(i)}$) to the Disable Function of the following PM.

For example, assuming that $AU_1$ sets on Stop-Mark 4, $SM_{1,4}^{(i)}$, $AU_2$ sets on stop-mark 2, $SM_{2,2}^{(i)}$, and that both Carry indications, $C_1^{(i+1)}$ and $C_2^{(i+1)}$, received from the previous PM indicates winning in the previous stage of the competition. In such case the Z-value competing in $AU_1$ wins, disables columns 1-3 via the Disable Function 113, and generates the only Carry-Out $C_1^{(i)}$. Detection of a single Carry-Out, indicating a single winner at the current stage, results is generating a win acknowledge signal $W^{(i)}$ via the Single Carry-Out detector 115 which is provided on the $W_1$ line to $AU_1$. The winning AU is then enabled to provide its RGB value $P_K$ to FB 50.

If for instance $AU_1$ and $AU_2$ both turn on Stop-Mark 4, $SM_{j,4}^{(i)}$, and Carry indications $C_1^{(i+1)}$ and $C_2^{(i+1)}$ indicates that both Z-values won in the previous stage, then the two Carry-Outs $C_1^{(i)}$ and $C_2^{(i)}$ transferred to the next PM ($PM^{(i+1)}$) will indicate also wining in the current stage.

FIG. 12 exemplifies the competition process of R=5 Z-values ($Z_1, Z_2, Z_3, Z_4$, and $Z_5$) belonging to AUs a through e. In this example the depth measure of the Z-values is of 32 bits, and the depth values are segmented into N=4 segments ($Z_j^{(3)}, Z_j^{(2)}, Z_j^{(1)}$, and $Z_j^{(0)}$) of 8 bits each. The total processing time in this example is 11 time units, while sequential wired-AND process (without Promotion Matrices) would take 32 time units.

In the first segment in this example, the MSSs, $Z_2^{(3)}, Z_3^{(3)}$, and $Z_5^{(3)}$ are all equal and greater than $Z_1^{(3)}$ and $Z_4^{(3)}$, and therefore only the corresponding $C_2^{(3)}, C_3^{(3)}$, and $C_5^{(3)}$ Carry-Out signals are produced to indicated the Z-values $Z_2$, $Z_3$, and $Z_5$, won the first stage. At the same time, the SM vectors of the LSSs are produced by the AUs.

As for the second segment of the Z-values, the 6 MSBs of the $Z_j^{(2)}$ numbers are all equal. A "Stop 7" SM is indicated for $Z_1^{(2)}$, and it does not further compete since the state of its $7^{th}$ bit is "0" ($Z_{1,7}^{(2)}=0$) while the state of the $7^{th}$ bit of all other Z-values in the segment is "1" ($Z_{2,7}^{(2)}=Z_{3,7}^{(2)}=Z_{4,7}^{(2)}=Z_{5,7}^{(2)}=1$): A "Stop 8" SM is indicated for $Z_3^{(2)}$ and it is also terminating further competition since the state of its $8^{th}$ bit is "0" ($Z_{3,8}^{(2)}=0$), while the state of the $8^{th}$ bit of the values that their competition proceeds in this bit stage is "1" ($Z_{2,8}^{(2)}=Z_{4,8}^{(2)}=Z_{5,8}^{(2)}=1$). Consequently, "Stop 9" SM is indications are produced for $Z_2^{(2)}$, $Z_4^{(2)}$, and $Z_5^{(2)}$, since they won in each and every bit stage in the segment. Accordingly, the processing of the SM$^{(2)}$ and C$^{(3)}$ vectors in PM$^{(2)}$ will produce Carry-Out indications $C_2^{(2)}$ and $C_5^{(2)}$ to the next PM, PM$^{(1)}$.

As for the third segment of the Z-values, a "Stop 2" SM is indicated for $Z_5^{(1)}$, which stops any further competing since $Z_{5,2}^{(1)}=0$ and $Z_{j,1}^{(1)}=0$ while $Z_{1,2}^{(1)}=Z_{2,2}^{(1)}=Z_{3,2}^{(1)}=Z_{4,2}^{(1)}=1$, and "Stop 9" SM is indicated for $Z_1^{(1)}$, $Z_2^{(1)}$, $Z_3^{(1)}$, and $Z_4^{(1)}$, since the values of their 6 MSBs are in equality. Accordingly, the processing of the SM$^{(1)}$ and C$^{(2)}$ vectors in PM$^{(1)}$ will produce a single Carry-Out indication $C_2^{(1)}$ to the last PM, PM$^{(0)}$. Since PM$^{(1)}$ determined a single winner, its detector 115 generates a corresponding indication $W_2$ to the winning AU, AU$_2$, which enables its RGB value $P_2$ into FB 50. Consequently, the Disable Function of PM$^{(1)}$ generates a Stop$^{(0)}$ indication which disables further processing in the last PM, PM$^{(0)}$.

The processing of the third segment is not carried out. Nevertheless, SM$^{(0)}$ indications are produced by the AUs. A "Stop 1" SM is indicated for $Z_5^{(0)}$, since $Z_{5,1}^{(0)}=0$ while $Z_{1,1}^{(0)}=Z_{2,1}^{(0)}=Z_{3,1}^{(0)}=Z_{4,1}^{(0)}=1$. A "Stop 7"SM is indicated for $Z_3^{(0)}$ and $Z_4^{(0)}$, since $Z_{1,r}^{(0)}=Z_{2,r}^{(0)}=Z_{3,r}^{(0)}=Z_{4,r}^{(0)}=1$ for r=2, 3, 4, 5, and 6, $Z_{3,7}^{(0)}=Z_{4,5}^{(0)}=0$ and $Z_{1,7}^{(0)}=Z_{2,7}^{(0)}=1$. Consequently, "Stop 8" SM is indicated for $Z_2^{(0)}$ and "Stop 9" SM is indicated for $Z_1^{(0)}$, since $Z_{2,8}^{(0)}=0$ and $Z_{1,8}^{(0)}=1$.

The competition time can be further reduced by merging the SM results of segments, while all segments are kept uniform in length. Such reduction allows clustering of results prior to the arrival of the Carry-Out indications from the previous PM. This approach further reduces the complexity from O(log$_2$ Z), to O((log$_2$ Z)/k), while k is a folding factor. For example, assuming Z=$2^{32}$, a sequential wired-AND process would take complexity of O(32). However, using 4 PMs of 8 bits each, the second half of the number is being "folded" at the time of processing the first half. As a result, the complexity is reduced to O(8+1+1). In this case the folding factor k is 32/10=3.2. In case of longer numbers of e.g. 64 bits, the order of complexity is not significantly changed: O(8+1+1+1). The advantage of this parallel approach is in that any bit length of Z-value numbers can be processed at almost the same short time, while keeping high efficiency.

Figure 13:
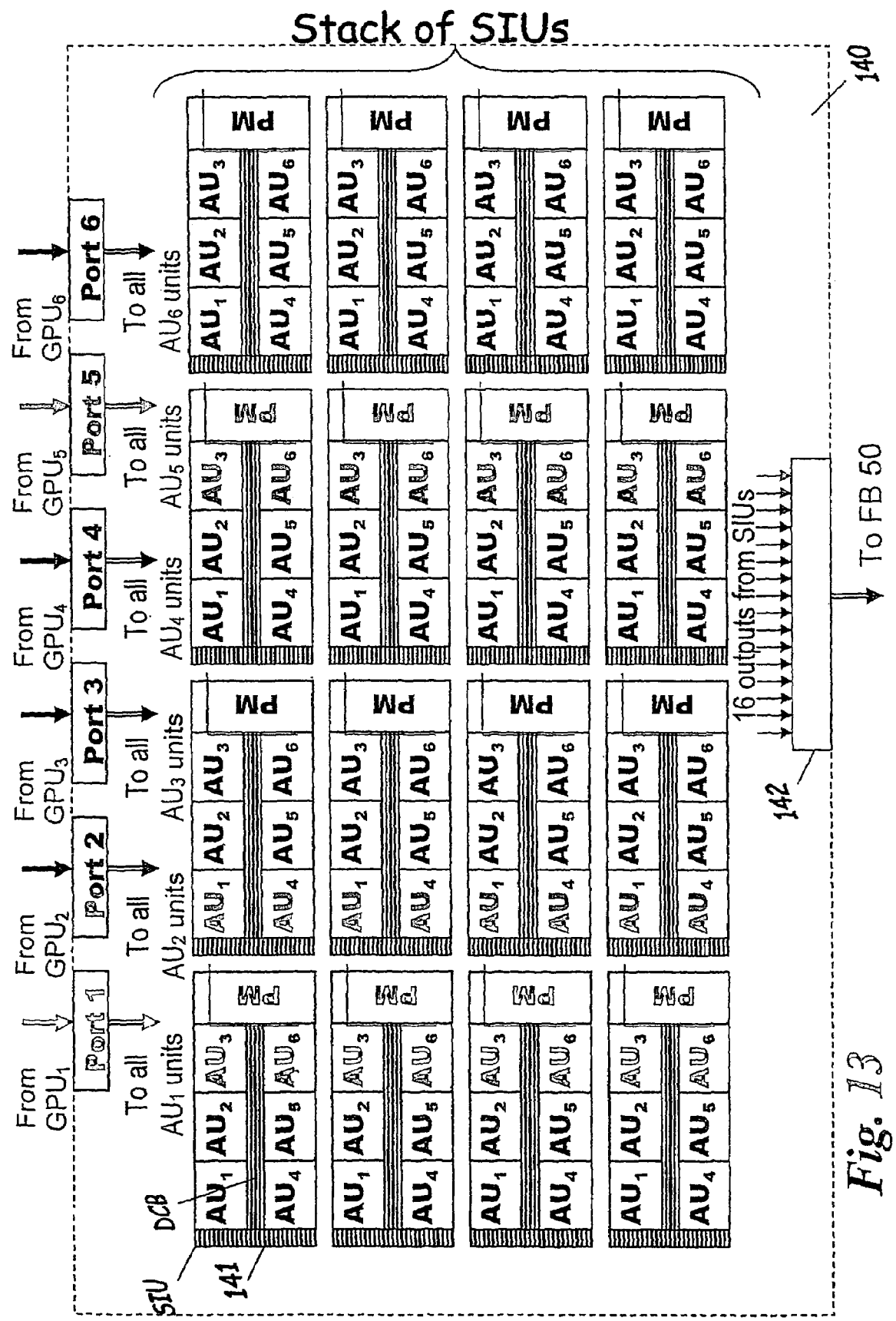
FIG. 13 is a block diagram illustrating a chip implementation of a preferred embodiment of the invention.

FIG. 13 is a block diagram illustrating a chip implementation 140 of a preferred embodiment of the invention (e.g., VLSI). This example illustrates an implementation for compositing 6 FBs from 6 different GPUs. This implementation realizes a compositing unit for simultaneously composing a plurality sub-images pixels by a plurality of Sub-Image Units (SIU). Each SIU comprises a set of AUs corresponding to the number of GPUs, a DCB, a PM, and Control Logic 141. The Control Logic 141 at each SIU sorts-out, from the data input stream retrieved via the Port-Port6 input ports, only those pixels that match with the coordinates of the respective sub-image. Each SIU outputs the RGB data of one of the sub-images, which is outputted to FB 50 via output port 142.

The entire compositing process is further parallelized by dividing each FB into 16 sub-images. For example, for an image having resolution of 1024×1024 pixels, each Sub-Image Unit (SIU) processes a 64×64 sub-image (1/16 of the image). If for example the pixels' color data is 24 bits long, the output of the stack of SIUs includes 12 KBytes of winning pixels color data.

Opposed to prior art, the present invention allows carrying out a single merging step for any number of GPUs R, as described in FIG. 5. The hierarchical structure of the prior art method has been replaced in the present invention by a unique, flat, and single step structure. The performance of this new structure is insensitive to the level of parallelism, i.e., the number of participating GPUs. Composition time is practically reduced to a single comparison and any arbitrary number of GPUs is allowed, with no sacrifice to the overall performance.

The above examples and description have of course been provided only for the purpose of illustration, and are not intended to limit the invention in any way. As will be appreciated by the skilled person, the invention can be carried out in a great variety of ways, employing techniques different from those described above, all without exceeding the scope of the invention.

The invention claimed is:

1. A method for detecting the greatest number from a plurality of Numbers $Z_1, Z_2, \ldots, Z_R$, comprising:
   a) dividing each of said Numbers into two or more binary Segments $Z_j^{(N-1)}, Z_j^{(N-2)}, \ldots, Z_j^{(0)}$, where the bit length of said Segments is determined according to their level of significance and where sets of said Segments are arranged according to their level of significance wherein the first set of Segments $Z_j^{(N-1)}, Z_j^{(N-1)}, \ldots, Z_j^{(N-1)}$ includes the Most Significant Segments of said Numbers and the last set of Segments $Z_j^{(0)}, Z_j^{(0)}, \ldots, Z_j^{(0)}$ includes the Least Significant Segments of said Numbers;
   b) simultaneously comparing the numerical values of the Segments $Z_1^{(K)}, Z_2^{(K)}, \ldots, Z_R^{(K)}$ having the same level of Significance, determining a group designating the Numbers which the numerical value of their Most Significant Segment is the greatest, and evaluating for the Least Significant Segments a Grade indicating their numerical size in comparison with the numerical value of the other Segments of the same level of significance;
   c) starting from the second set of Segments $Z_1^{(N-2)}, Z_2^{(N-2)}, \ldots, Z_R^{(N-1)}$, comparing the Grades of the Segments of the Numbers which corresponds to said group, and removing from said group any Number indication with a Grade that is less than the highest Grade which corresponds to another Number indication in said group;
   d) repeating step c) until the last set of Segments $Z_1^{(0)}, Z_2^{(0)}, \ldots, Z_R^{(0)}$ is reached or until a single Number is designated by said group.

2. A method according to claim 1, wherein the Numbers are the depth values of pixels of multiple three-dimensional raster images.

3. A method according to claim 1, further comprising comparing the Numbers with a threshold value and carrying out the detection of the greatest number only with the Numbers which their value is above or below said threshold value.

4. A method according to claim 1, for determining the smallest number, wherein the group is determined to designate the Numbers which the numerical value of their Most Significant Segment is the smallest and the Numbers designations are removed from said group whenever their Grade is greater than the smallest Grade which corresponds to another Number indication in said group.

5. A method according to claim 1, wherein the all the segments are of the same bit length.

6. A method according to claim 1, wherein the bit length of one or more of the Least Significant Segments is greater than the bit length of the Most Significant Segment.

7. A method for compositing a plurality of three-dimensional Sub-Images by examining the Depth values $Z_1$, $Z_2, \ldots, Z_R$, of the Pixels corresponding to same spatial location in each Sub-Image and compositing the content of the Pixel having the greatest Depth value, comprising:
  a) dividing each of said Depth values into two or more binary Segments $Z_j^{(N-1)}, Z_j^{(N-2)}, \ldots, Z_j^{(0)}$, where the bit length of said Segments is determined according to their level of significance and where sets of said Segments are arranged according to their level of significance wherein the first set of Segments $Z_j^{(N-1)}$, $Z_j^{(N-1)}, \ldots, Z_j^{(N-1)}$ includes the Most Significant Segments of said Depth values and the last set of Segments $Z_j^{(0)}, Z_j^{(0)}, \ldots, Z_j^{(0)}$ includes the Least Significant Segments of said Depth values;
  b) simultaneously comparing the numerical values of the Segments $Z_1^{(K)}, Z_2^{(K)}, \ldots, Z_R^{(K)}$ having the same level of Significance, determining a group designating the Depth values which the numerical value of their Most Significant Segment is the greatest, and evaluating for the Least Significant Segments a Grade indicating their numerical size in comparison with the numerical value of the other Segments of the same level of significance;
  c) starting from the second set of Segments $Z_1^{(N-2)}$, $Z_2^{(N-2)}, \ldots, Z_R^{(N-1)}$, comparing the Grades of the Segments of the Depth values which corresponds to said group, and removing from said group any Depth value indication with a Grade that is less than the highest Grade which corresponds to another Depth values in said group;
  d) repeating step c) until the last set of Segments $Z_1^{(0)}$, $Z_2^{(0)}, \ldots, Z_R^{(0)}$ is reached or until a single Depth values is designated said group.

8. A method according to claim 7, further comprising comparing the Depth values with a threshold value and carrying out the detection of the greatest number only with the Depth values which their value is above or below said threshold value.

9. A method according to claim 7, for determining the smallest number, wherein the group is determined to designate the Depth values which the numerical value of their Most Significant Segment is the smallest and the Depth values designations are removed from said group whenever their Grade is greater than the smallest Grade which corresponds to another Number indication in said group.

10. A method according to claim 7, wherein the all the segments are of the same bit length.

11. A method according to claim 7, wherein the bit length of one or more of the Least Significant Segments is greater than the bit length of the Most Significant Segment.

12. A system for compositing a plurality of three-dimensional Sub-Images, comprising:
  a) Bus lines for concurrently introducing the bits of a plurality of Depth values of pixels, where on each Bus line the bits having the same level of significance are introduced, the logical state of said lines is set to "1" whenever the logical state of all of said bits is "1", and it is set to "0" if the logical state of at least one of said bits is "0";
  b) Associative Units for concurrently reading the data of the pixels corresponding to the same spatial location in said Sub-Images, dividing the Depth value of each read pixel into two or more segments, introducing said segments on the respective lines of said Bus, sensing the logical state of said lines, and accordingly concurrently producing intermediate comparison results for the Most Significant Segments of said values which designates the Depth values having the greatest numerical value, and for the Least Significant Segments Stop-Marks Grading indicating their numerical size in comparison with the numerical value of the other Segments of the same level of significance;
  c) Promotion Matrices for serially producing intermediate comparison results for each subsequent set of segments in order of significance, starting from the set of segments following the set of Most Significant Segments, by removing from the previously produced intermediate comparison results Depth value designations for which the corresponding Stop-Mark Grading is less than the greatest Stop-Mark Grading that is related to one of said intermediate comparison results,
    where said Promotion Matrices are capable of indicating that the currently produced intermediate comparison results includes a single designation such that the pixel data can be retrieved for the compositing from the respective Associative Unit.

13. A system according to claim 12, further comprising disabling means for disabling the operation of subsequent Promotion Matrices whenever it is indicated by a Promotion Matrix that the currently produced intermediate comparison results includes a single designation.

14. The system of claim 12, wherein the system is implemented on a single integrated circuit chip.

15. The system of claim 12, wherein the chip is a VLSI implementation.

16. An Associative Unit for introducing the bits of segments of a Depth value of a pixel on the lines of Wired-AND Bus, issuing Carry-Out and Stop-Mark indications, and enabling the data of said pixel according to a corresponding external enabling indication, comprising:
  a) Primary Segment Logic circuitry for enabling the introducing of the bits of the Most Significant Segment of said Depth value on the respective lines of said Bus, sensing the logical state of said lines starting from the Most Significant line, and if the logical states of the sensed line and of the corresponding bit is "0" disabling the sensing of the consecutive Bus lines, otherwise enabling the sensing to proceed until the end of said Segment and issuing a Carry-Out indication;
  b) One or more Non-Primary Segment logic circuitries for enabling the introducing of the bits of the Least Significant Segments of said Depth value on the respective lines of said Bus, sensing the logical state of said lines starting from the Most Significant line, and if the logical states of the sensed line and of the corresponding bit is "0" disabling the sensing of the consecutive Bus lines and issuing a Stop-Mark indication which corresponds to the level of significance of said bit in its Segment, otherwise enabling the sensing to proceed until the end of said Segment and issuing a Stop-Mark indication having level of significance being one level higher than the Most Significant bit in said Segment; and
  c) a gate for enabling the output of said data whenever said enabling indication is received,
  where the logical state of each line of said Bus is set to "1" whenever the logical state of all of the bits introduced on it is "1", and it is set to "0" if the logical state of at least one of said bits is "0", and where said enabling indication is determined externally according to said Carry-Out and Stop-Mark indications.

17. An Associative Unit according to claim 16, further comprising means for enabling the operation of the Primary and Non-Primary Segment logic circuitries whenever the value of the Depth value is greater than a threshold value.

18. An Associative Unit according to claim 17, wherein the means are enabling the operation of the Primary and Non-Primary Segment logic circuitries whenever the value of the Depth value is smaller than a threshold value.

19. An Associative Unit according to claim 16, in which the sensing of the consecutive Bus lines is disabled whenever the logical states of the sensed line and of the corresponding bit is "1".

* * * * *